Figure 1:
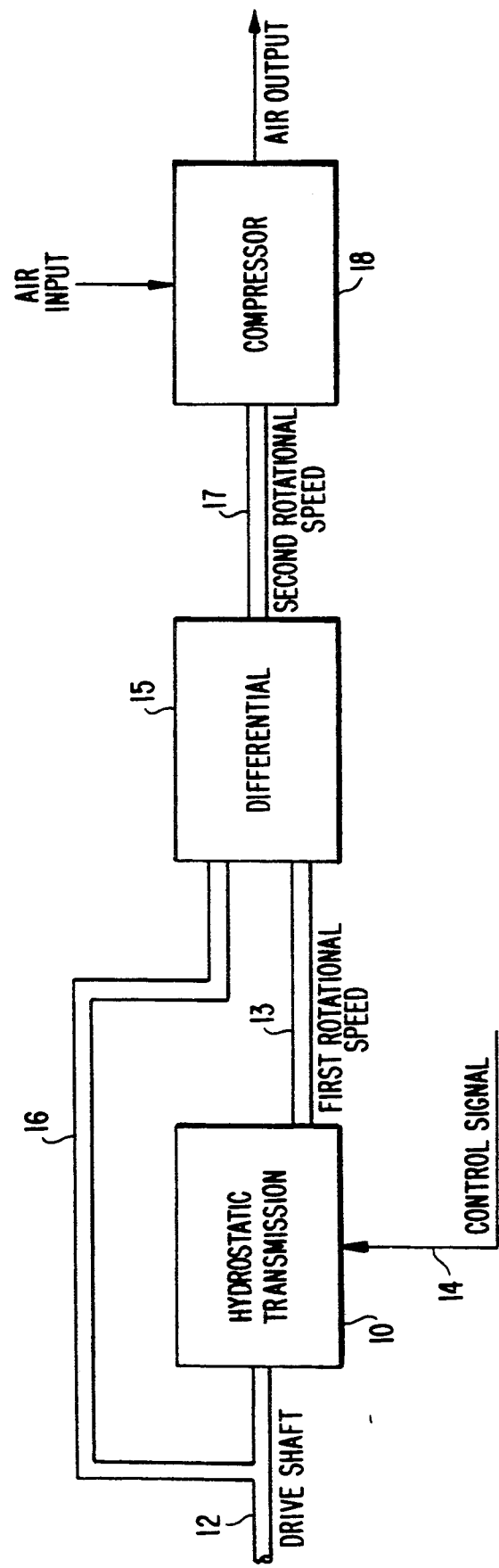

United States Patent [19]

Quick et al.

[11] Patent Number: 5,125,806
[45] Date of Patent: Jun. 30, 1992

[54] INTEGRATED VARIABLE SPEED COMPRESSOR DRIVE SYSTEM

[75] Inventors: David C. Quick, Rockford, Ill.; Allen A. Wood, Beloit, Wis.; Robert Grennan, Rockford, Ill.

[73] Assignee: Sundstrand Corporation, Rockford, Ill.

[21] Appl. No.: 539,448

[22] Filed: Jun. 18, 1990

[51] Int. Cl.⁵ .............................................. F04B 17/00
[52] U.S. Cl. ................. 417/423.6; 417/212; 475/72
[58] Field of Search ............ 417/423.5, 423.6, 212; 475/72; 415/208.1, 182.1, 27

[56] References Cited

U.S. PATENT DOCUMENTS

| | | | |
|---|---|---|---|
| 2,390,487 | 11/1941 | Lawrence et al. | 230/11 |
| 2,441,779 | 12/1945 | Troeger et al. | 230/115 |
| 2,452,704 | 8/1943 | Wahlmark et al. | 93/1.5 |
| 2,523,517 | 5/1944 | Cronin | 93/1.5 |
| 2,539,571 | 10/1945 | Deschamps | 103/161 |
| 2,697,917 | 9/1951 | Mayer | 62/6 |
| 3,396,607 | 8/1968 | Ross | 475/82 |
| 3,488,947 | 1/1970 | Miller et al. | 475/72 |
| 3,665,788 | 5/1972 | Nyman | 475/72 |
| 3,905,251 | 9/1975 | Greene | 475/72 |
| 3,985,465 | 10/1976 | Sheldon et al. | 415/209.3 |
| 4,380,893 | 4/1983 | Stokes et al. | 415/27 |
| 4,637,275 | 1/1987 | Whalen | 475/72 |
| 4,799,857 | 1/1989 | Bauer et al. | 415/208.1 |
| 4,938,661 | 7/1990 | Kobayashi et al. | 415/208.1 |

Primary Examiner—Richard A. Bertsch
Assistant Examiner—Michael I. Kocharov
Attorney, Agent, or Firm—Antonelli, Terry Stout & Kraus

[57] ABSTRACT

An integrated variable speed compressor drive system for driving a compressor which compresses air from an air source and outputs compressed air. The integrated variable speed compressor drive system includes a hydrostatic transmission coupled to a drive shaft for converting a varying rotational speed of the drive shaft into a first rotational speed. A differential coupled to the hydrostatic transmission and the drive shaft is included in the invention for outputting in response to the varying rotational speed of the drive shaft and the first rotational speed of the hydrostatic transmission, a second rotational speed. The differential is coupled to the compressor and drives the compressor using the second rotational speed. The second rotational speed is related to the first rotational speed output by the hydrostatic transmission. The hydrostatic transmission in response to a control signal supplied thereto varies the first rotational speed to thereby control the second rotational speed which drives the compressor.

26 Claims, 2 Drawing Sheets

INTEGRATED VARIABLE SPEED COMPRESSOR DRIVE SYSTEM

TECHNICAL FIELD

The present invention relates to compressor drive systems for driving an air compressor. More particularly, the present invention relates to an apparatus for driving an air compressor in response to a control signal wherein the compressor drive system makes use of a varying rotational speed to generate the rotational speed used to drive the air compressor.

BACKGROUND ART

Typically, in a passenger aircraft, air being supplied to the cabin for the comfort of the passengers is conventionally obtained from air bled from the engine. This type of system has proven inefficient for certain types of aircraft engines Therefore, other systems have been proposed.

One proposed alternative to the conventional system is to provide an air compressor driven by an engine drive shaft. Although such a system would be advantageous, the system must satisfy a number of requirements.

Primarily, such a system must be able to make use of a varying rotational speed supplied by the drive shaft of the aircraft engine. Also, the system must fit within the space provided within the engine installation and maintain required cabin air flow and pressure and supply a controlled amount of air to the cabin regardless of engine speed.

As is well-known, the rotational speed of an engine drive shaft varies over a wide rotational speed range. Thus, an air compressor coupled directly to the drive shaft of an engine would suffer from the disadvantage of having applied thereto a varying rotational speed. The varying rotational speed applied to the compressor makes it nearly impossible to maintain a required airflow and pressure in the cabin of an aircraft as demanded by varying altitude and air speed. Additional apparatus is necessary in order to cause a compressor being driven by a varying rotational speed to maintain a require airflow and pressure in the cabin of the aircraft The additional apparatus may take the form of apparatus for modifying the flow of air output by the compressor or apparatus for converting the varying rotational speed into a controlled rotational speed by the use of a variable speed transmission.

For example, an air conditioning apparatus is disclosed by U.S. Pat. No. 2,697,917. The apparatus disclosed in U.S. Pat. No. 2,697,917 provides an air conditioning apparatus of an aircraft having an air modulating apparatus for modulating the air from an air pump so as to maintain the required pressure and temperature in the enclosure of the aircraft. Although U.S. Pat. No. 2,697,917 provides for the modulation of air being supplied to an enclosure of an aircraft in order to regulate the pressure and temperature in the enclosure. Such a system does not attempt to modify the varying rotational speed being applied to the air pump. Thus, the compressor must operate at very high speeds and power levels when the speed of the aircraft engine is near maximum.

U.S. Pat. No. 2,441,779 discloses a rate of flow regulator for controlling the amount of air delivered to a pressurized cabin of an aircraft. Particularly, U.S. Pat. No. 2,441,779 provides differential gearing and a pump for controlling the speed of a supercharger to provide certain air flow rates irrespective of the speed of the engine. The pump in U.S. Pat. No. 2,441,779 serves as a brake to control the speed of the supercharger.

U.S. Pat. No. 2,390,487 discloses a flow regulating system for controlling the rate of flow of air to a supercharger which outputs air to an aircraft cabin. The flow regulating system disclosed by U.S. Pat. No. 2,390,487 suffers from the disadvantage of a hydraulic pump serving as the brake to control the rotational speed of the compressor.

U.S. Pat. No. 4,523,517 discloses a system which provides an electric motor to drive a compressor. The electric motor in U.S. Pat. No. 4,523,517 operates by making use of power generated by electric generators driven by the aircraft engine. The system disclosed by U.S. Pat. No. 4,523,517 suffers from the disadvantage of the rotational speed being output by the electric motor increasing when the aircraft engine speed increases.

Further examples of variable speed compressor drive systems are disclosed by U.S. Pat. Nos. 2,452,704 and 2,539,571. However, such systems do not integrate the compressor with the rest of the system and do not use the more efficient split path power drive concept.

DISCLOSURE OF INVENTION

The present invention provides an integrated variable speed compressor system for driving a compressor by using varying rotational speed supplied by a drive shaft wherein the rotational speed applied to the compressor is controlled by a control signal. Particularly, the present invention makes use of a varying rotational speed from the drive shaft of an aircraft in order to provide a controlled rotational speed to drive a compressor which compresses air being supplied to the cabin of the aircraft.

The integrated variable speed compressor drive system of the present invention includes a hydrostatic transmission coupled to a drive shaft for converting a varying rotational speed of the drive shaft into a first rotational speed and outputting the first rotational speed. The hydrostatic transmission is a hydraulic unit having a hydraulic motor and pump whereby the angle of the swash plate of the hydraulic unit is controlled in response to a control signal in order to control the first rotational speed.

The control signal may be provided by, for example, the pressure or temperature sensors positioned within the cabin of the aircraft, for detecting temperature or pressure respectively of the environment within the cabin of the aircraft. The control signal may also be provided by an environmental control system which is used to control the environment within the cabin of the aircraft. The integrated variable speed compressor drive system of the present invention also includes a differential coupled to the hydrostatic transmission and the drive shaft for outputting, in response to the varying rotational speed of the drive shaft, and the first rotational speed of the hydrostatic transmission, a second rotational speed. The differential receives the first rotational speed from the hydrostatic transmission and the varying rotational speed of the drive shaft and outputs a second rotational speed which is related to the first rotational speed. The first rotational speed which is controlled in response to the control signal applied to the hydrostatic transmission causes the second rotational speed output by the differential to vary relative thereto. The differential is coupled to the compressor and drives the compressor using the second rotational speed. In the integrated variable speed compressor drive system of the present invention, the control signal supplied to the hydrostatic transmission causes the hydrostatic transmission to vary the first rotational speed output thereby. A change in the first rotational speed which is supplied to the differential causes a corresponding change in the second rotational speed output by the differential. Being that the second rotational speed drives the compressor, the control signal supplied to the hydrostatic transmission thereby controls the amount of air being compressed by the compressor.

As indicated above, the hydrostatic transmission is provided by a hydraulic unit including a hydraulic motor and pump and swash plate. The angle of the swash plate which controls the first rotational speed output by the hydrostatic transmission is controlled by the control signal supplied to the hydrostatic transmission.

The differential is accomplished by a planetary gear set having a plurality of planet gears, a carrier, and a plurality of ring gears or any other type of differential such as a bevel gear differential.

The compressor may be of the centrifugal air compressor type having one or more stages each having a plurality of blades.

The present invention provides an integrated variable speed compressor drive system which is capable of being operated using the varying rotational speed output on the drive shaft of an aircraft. As is well known, the drive shaft of the engine of an aircraft rotates at varying speeds due to various factors. Any attempt to make use of this varying rotational speed must compensate for the varying rotational speed and convert the varying rotational speed into a controlled output speed to drive a compressor at the optimum operating speed. The present invention accomplishes this requirement. Further, the present invention provides apparatus which enables the dynamic control of the rotational speed used to drive a compressor regardless of the varying rotational speed of the drive shaft.

The integrated variable speed compressor drive system of the present invention as described above may be combined with a compressor for a complete unit for supplying a controlled amount of compressed air to the cabin of an aircraft by making use of the varying rotational speed provided by the drive shaft of the engine of the aircraft.

BRIEF DESCRIPTION THE DRAWINGS

Figure 2:
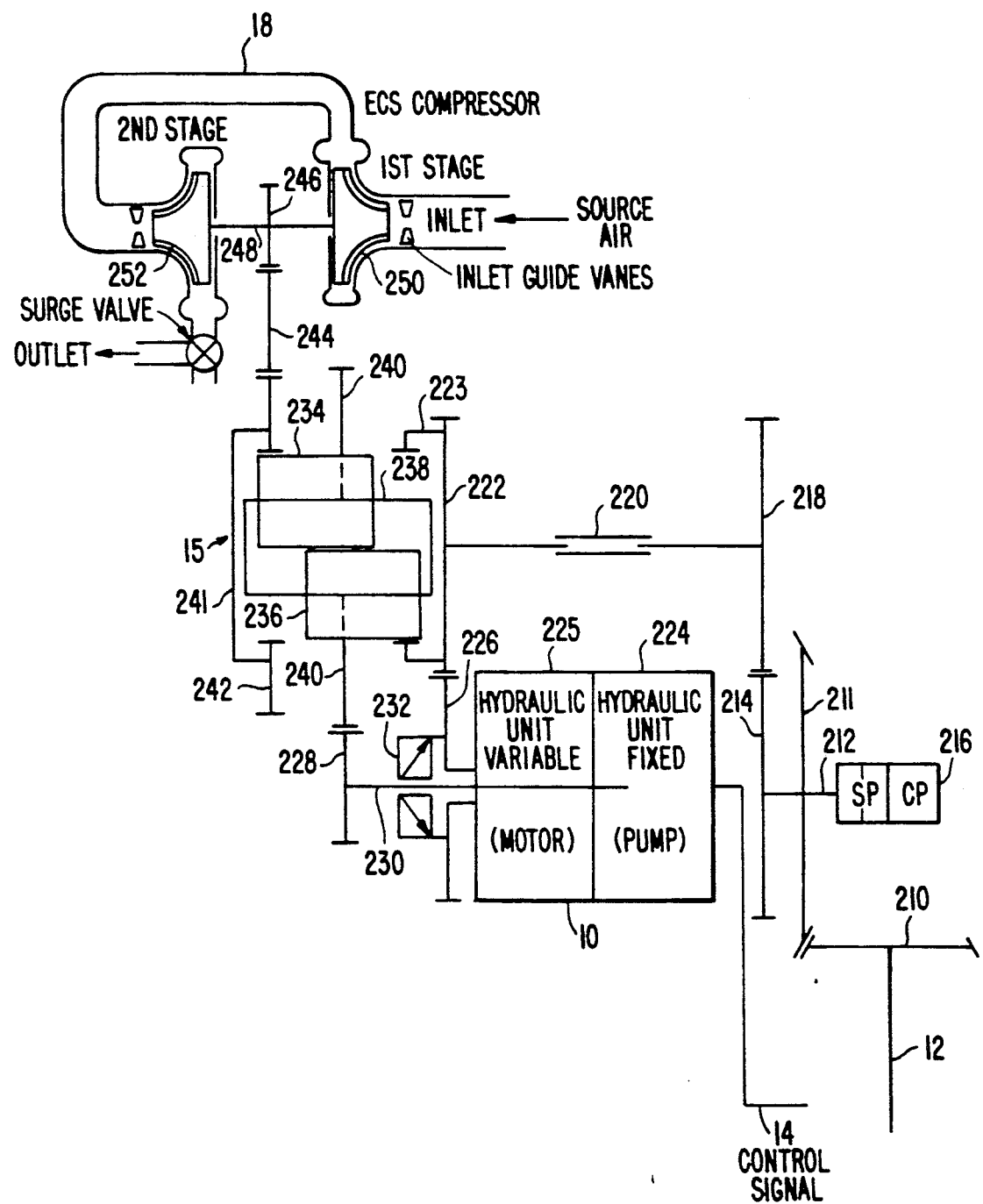

The features of the present invention which are believed to be novel are set forth with particularity in the appended claims The invention may be best understood, however, by reference to the following description with the accompanying drawings in which FIG. 1 is a schematic diagram of the overall elements included in the integrated variable speed compressor drive system of the present invention; and FIG. 2 is a detailed schematic diagram of the elements included in the integrated variable speed compressor drive system of the present invention

BEST MODE FOR CARRYING OUT THE INVENTION

FIG. 1 illustrates an overview of the elements included within the integrated variable speed compressor drive system of the present invention.

As shown in FIG. 1, the integrated variable speed compressor drive system of the present invention includes a hydrostatic transmission 10 accomplished by a hydraulic unit which is coupled to a drive shaft 12. The drive shaft 12 may be provided from the engine of an aircraft (not shown) or any other apparatus which outputs a varying rotational speed on the drive shaft 12. The hydrostatic transmission 10 as shown in FIG. 1 receives a varying rotational speed on drive shaft 12 converts the varying rotational speed of the drive shaft 12 into a first rotational speed and outputs the first rotational speed on coupling device 13. A control signal 14 is also provided to the hydraulic unit 10.

The control signal 14 may be provided by temperature or pressure sensors (not shown) positioned in the cabin of the aircraft, wherein signals from the sensors are used to control the first rotational speed output by the hydrostatic transmission 10. The control signal 14 may also be provided by an environmental control system (not shown) which is used to control the temperature and pressure of the environment in the cabin of the aircraft.

The control of the first rotational speed in the hydrostatic transmission 10 is accomplished by controlling the angle of a swash plate (not shown) which varies the displacement volume of one of the hydraulic units of the hydrostatic transmission 10. Controlling the angle of the swash plate in the hydrostatic unit controls the speed of rotation of the first rotational speed output by the hydrostatic unit 10.

A differential 15 is provided in the integrated variable speed compressor drive system of the present invention. The differential 15 is coupled to a coupling device 16 to the drive shaft and to the coupling device 13 to the hydrostatic transmission 10. Thus, the differential 15 is coupled to the drive shaft 12 and the hydrostatic transmission 10 and thereby receives the varying rotational speed and the first rotational speed respectively. The differential 15 in response to the varying rotational speed of the drive shaft 12 and the first rotational speed output by the hydrostatic transmission 10 outputs a second rotational speed on coupling device 17. The second rotational speed is related to the first rotational speed output by the hydrostatic transmission 10. The differential 15 essentially operates by receiving the varying rotational speed and the first rotational speed and outputting a the second rotational speed on coupling device 17. The second rotational speed is related to the varying rotational speed on the drive shaft 12 and the first rotation speed output by hydrostatic transmission 10.

A compressor 18 is coupled to coupling device 17 in order to be driven by the second rotational speed output by differential 15. The compressor 18 compresses air supplied to an input of the compressor 18 and outputs compressed air on an output of the compressor 18. The compressed air output by the output of the compressor 18 is supplied to the cabin of the aircraft and the air supplied to the input of the compressor 18 may be obtained from air outside the aircraft cabin. Also, the compressor 18 may of the centrifugal air compressor type which will be described in more detail below.

The integrated variable speed compressor drive system of the present invention operates by making use of the varying rotational speed on the drive shaft 12 to drive the compressor 18 to supply air to the cabin of an aircraft.

The integrated variable speed compressor drive system of the present invention operates as follows.

The hydrostatic transmission 10 converts the varying rotational speed on drive shaft 12 to a first rotational speed. The hydrostatic transmission 10 also provides for the control of the first rotational speed in response to a control signal which controls the angle of a swash plate therein. The angle of the swash plate in the hydrostatic transmission 10 controls the speed of rotation (first rotational speed) output by the hydrostatic transmission 10.

The differential 15 being coupled to the drive shaft 12 and the hydrostatic transmission 10 receives the varying rotational speed and the first rotational speed respectively. The differential 15 in response to the varying and first rotational speeds outputs a second rotational speed which is related to the varying and first rotational speeds. As indicated above, the first rotational speed is controlled by the control signal 14 supplied to the hydrostatic transmission 10.

The compressor 18 coupled to the differential 15 is driven by the second rotational speed output by the differential 15. The second rotational speed controls the amount of air which is compressed by the compressor and output to the cabin of an aircraft FIG. 2 schematically illustrates in more detail the integrated variable speed compressor drive system of the present invention. As shown in FIG. 2, the drive shaft 12 is attached to a first bevel gear 210 which meshes with a second bevel gear 211. The bevel gears 210 and 211 can be replaced by any other gears which accomplish the intended purpose. The second bevel gear 211 is attached to a first shaft 212 which is also attached to a first spur or helical gear 214. The first shaft 212 is also attached to a hydraulic pump unit 216, which includes a scavenge pump and a charge pump. The pump unit 216 is used to circulate oil for lubrication between various places in the system and a sump (not s: wn).

The first spur or helical gear 214 meshes with a second spur or helical gear 218 which is attached to a coupling device 220. The coupling device 220 is also attached to a third spur gear 222 having a first ring gear 223 attached thereto.

The hydrostatic transmission 10 is provided by two hydraulic units 224 and 225 wherein one unit functions as a pump and the other unit functions as a motor. The functions of the two units can be interchanged depending on the engine speed and the required compressor speed. One unit is set for fixed displacement and the other unit is set for variable displacement by varying the angle of the swash plate.

A fourth spur gear 226 is coupled to the hydraulic unit 225 (motor) of the hydrostatic transmission 10 and a fifth spur gear 228 is coupled through a second shaft 230 to the hydraulic unit 224 (pump) of the hydrostatic transmission 10. An overrunning clutch 232 is coupled between the second shaft 230 and the fourth spur gear 226 to prevent reverse movement of the second shaft 230 during startup.

It should be noted that the differential 15 includes the third spur gear 222 and the first ring gear 223. As indicated above, the third spur gear 222 of the differential 15 meshes with the fourth spur gear 226 of the hydrostatic transmission 10. The differential 15 also includes first and second planet gears 234 and 236 respectively which are carried in a carrier 238. The carrier 238 has attached thereto a sixth spur gear 240 which mesh with the fifth spur gear 228 of the hydrostatic transmission 10. The fifth spur gear 228 as described above is attached to second shaft 230 of the hydrostatic transmission 10.

The differential 15 further includes a second ring gear 241 which has attached thereto a seventh spur gear 242. The first planet gear 234 meshes with the second ring gear 241, and the second planet gear 236 meshes with the first ring gear 223. The seventh spur gear 242 of the differential meshes with an idler spur gear 244. The idler spur gear 244 meshes with an eighth spur gear 246 which is attached to the drive shaft 248 of the compressor 18.

The compressor 18 is of the centrifugal compressor type having a plurality of stages. The compressor 18 shown in FIG. 2 includes a first stage which receives the input air and a second stage which outputs the compressed air to the air cabin. The invention is not limited to a two stage compressor. The first stage of the compressor 18 includes a plurality of first blades 250 which are rotated by the compressor drive shaft 248. The first stage of the compressor 18 also include inlet guide vanes for guiding the input air to the first blades 250.

The second stage of the compressor 18 includes a plurality of second blades 252 which are attached to the compressor drive shaft 248. The second stage of the compressor also includes inlet guide vanes for guiding air from the first stage to the second blades 252. The second stage of the compressor 18 also further includes a surge valve for eliminating unstable operation of the air compressor.

As described, with respect to FIG. 1, the integrated variable speed compressor drive system of the present invention as shown in detail in FIG. 2 makes use of the varying rotational speed on the drive shaft 12 to drive the drive shaft 248 of the compressor 18. The drive shaft 12 is coupled to the differential through first bevel gear 210, second bevel gear 211, first spur gear 214, second spur gear 218 and coupling device 220 which is attached to third spur gear 222 of the differential 15. The drive shaft 12 is also coupled to the hydrostatic transmission 10 through first bevel gear 210, second bevel gear 211, first shaft 212, first spur gear 214, second spur gear 218, coupling device 220, and third spur gear 222 which meshes with the fourth spur gear 226 of the hydrostatic transmission 10.

The hydrostatic transmission 10 makes use of the varying rotational speed supplied by the drive shaft 12, converts the varying rotational speed to a first rotational speed and outputs the first rotational speed on second shaft 230 which is attached to the fifth spur gear 228. The first rotational speed output on second shaft 230 and thereby the fifth spur gear 228 is controlled in response to the control signal 14 supplied to the hydrostatic transmission 10. The control signal is a signal related to the desired amount of air to be output to the cabin of an aircraft in order to control the environment therein. The control signal controls the angle of the swash plate of the hydrostatic transmission 10.

The hydrostatic transmission 10 is coupled to the differential 15 through fifth spur gear 228 which is attached to the second shaft 230 and sixth spur gear 240 which is attached to the carrier 238 of the differential, thereby supplying the first rotational speed output by the hydrostatic transmission 10 to the differential 15. The differential 15, in response to the first rotational speed supplied by the hydrostatic transmission 1? on fifth spur gear 228 and the varying rotational speed supplied by the drive shaft 12 on third spur gear 222 outputs a second rotational speed on the seventh spur gear 242.

The second rotational speed output by the differential 15 on the seventh spur gear 242 is used to drive the compressor 18 through idler spur gear 244 and the eighth spur gear 246 which is attached to the compressor drive shaft 248.

The second rotational speed output by the differential 15 on the seventh spur gear 242 is related to the first rotational speed output by the hydrostatic transmission 10 on the fifth spur gear 228. The first rotational speed output by the hydrostatic transmission 10 is controlled by the control signal 14 supplied to the hydrostatic transmission 10. Thus, the control signal 14 controls the second rotational speed output by the differential 15 to drive the compressor 18, thereby controlling the amount of compressed air output by the compressor 18.

The integrated variable speed compressor drive system of the present invention including the hydrostatic transmission and the differential may be combined with a compressor for a complete unit for supplying a controlled amount of compressed air to the cabin of the aircraft by making use of the varying rotational speed provided by the drive shaft of the engine of the aircraft. Such a complete unit can be made compact enough to be placed in the engine installation of the aircraft.

While the present invention has been described in terms of its preferred embodiment, it should be understood that numerous modifications may be made thereto without departing from the spirit and scope of the present invention as defined in the appended claims. For example, the present invention may be used in any application which requires a drive system which drives an apparatus by making use of a varying rotational speed. It is intended that all such modifications fall within the scope of the appended claims.

We claim:

1. The integrated variable speed compressor drive system for driving a compressor which compresses air from an air source and outputs compressed air, said system comprising:
    a hydrostatic transmission coupled to a drive shaft for converting a varying rotational speed of said drive shaft into a first rotational speed and outputting said first rotational speed; and
    a differential coupled to said hydrostatic transmission and said drive shaft for outputting, in response to said varying rotational speed of said drive shaft and said first rotational speed of said hydrostatic transmission, a second rotational speed;
    wherein said differential is coupled to said compressor and drives said compressor using said second rotational speed;
    wherein said hydrostatic transmission in response to a control signal varies said first rotational speed, thereby controlling said second rotational speed which drives said compressor;
    wherein said hydrostatic transmission includes a first hydraulic unit performing functions of a hydraulic motor and a second hydraulic unit performing functions of a hydraulic pump;
    wherein said differential includes
    first, second and third sets of gear means,
    wherein said first set of gear means is coupled to said drive shaft,
    wherein said second set of gear means is carried by a carrier, said second set of gear means meshing with said first set of gear means and said carrier being coupled to said hydrostatic transmission, and wherein said third set of gear means drives said compressor, said third set of gear means meshing with said second set of gear means;
    wherein said hydrostatic transmission further includes
    fourth gear means connected to said hydraulic unit performing functions of a hydraulic motor and coupled to said drive shaft, and
    fifth gear means connected to said hydraulic unit performing functions of a hydraulic pump and coupled to said carrier of said differential;
    wherein said carrier is connected to six gear means for meshing with said fifth gear means of said hydrostatic transmission;
    an overrunning clutch coupled between said fourth gear means and said fifth gear means of said hydrostatic transmission to prevent reverse movement of said fifth gear means relative to said fourth gear means during start up of said hydrostatic transmission; and
    a pump unit coupled to said drive shaft for circulating oil for lubricating said system;
    wherein said first set of gear means includes:
    a first spur gear coupled to said drive shaft, and
    a first ring gear attached to said first spur gear, said first ring gear meshing with said second set of gear means.

2. The integrated variable speed compressor drive system according to claim 1, wherein said second set of gear means comprises:
    a plurality of planet gears;
    wherein a first planet gear of said plurality of planet gears is provided for meshing with said first ring gear and a second planet gear of said plurality of planet gears is provided for meshing with said third set of gear means; and
    said plurality of planet gears are carried by said carrier which has attached thereto said sixth gear means.

3. The integrated variable speed compressor drive system according to claim 2, wherein said third set of gear means comprises:
    a second ring gear for meshing with said second planet gear of said plurality of planet gears of said second set of gear means; and
    a second spur gear attached to said second ring gear;
    wherein said second spur gear is coupled to a drive shaft of said compressor.

4. The integrated variable speed drive system according to claim 3, wherein:
    said compressor is a centrifugal air compressor which includes a plurality of stages having a first stage for receiving input air and a second stage for outputting air compressed by said compressor.

5. The integrated variable speed drive system according to claim 4, wherein:
    said plurality of stages of said compressor are driven by said second rotational speed outputting by said differential.

6. The integrated variable speed drive system according to claim 5, wherein:
    said first stage includes inlet guide vanes, disposed in said first stage, for guiding input air into the compressor.

7. The integrated variable speed drive system according to claim 6, wherein:

each of said plurality of stages other than said first stage includes inlet guide vanes, disposed therein for guiding air thereto from a previous stage.

8. The integrated variable speed drive system according to claim 7, wherein said compressor further comprises:
a surge valve for eliminating air surges in said compressor.

9. The integrated variable speed compressor drive system according to claim 1, wherein:
said compressor is a centrifugal air compressor which includes a plurality of stages having a first stage for receiving input air and a second stage for outputting air compressed by said compressor.

10. The integrated variable speed compressor drive system according to claim 9, wherein:
said plurality of stages of said compressor are driven by said second rotational speed output by said differential.

11. The integrated variable speed compressor drive system according to claim 10, wherein:
said first stage includes inlet guide vanes disposed in said first stage, for guiding input air into said compressor.

12. The integrated variable speed compressor drive system according to claim 11, wherein:
each of said plurality of stages including said first stage includes inlet guide vanes, disposed therein for guiding air thereto from a previous stage.

13. The integrated variable speed compressor drive system according to claim 12, wherein said compressor further comprises:
a surge valve for eliminating air surges in said compressor.

14. Apparatus for supplying a controlled amount of compressed air to the cabin of an aircraft, wherein said apparatus makes use of a varying rotational speed supplied by a drive shaft, said apparatus comprising:
a hydrostatic transmission coupled to said drive shaft for converting a varying rotational speed of said drive shaft into a first rotational speed and outputting said first rotational speed;
a differential coupled to said hydrostatic transmission and said drive shaft for outputting, in response to said varying rotational speed of said drive shaft and first rotational speed of said hydrostatic transmission, a second rotational speed;
a compressor, coupled to said differential and being drive by said second rotational speed output by said differential, for compressing air from an air source and outputting compressed air;
wherein said hydrostatic transmission in response to a control signal varies said first rotational speed, thereby controlling said second rotational speed which drives said compressor;
wherein said hydrostatic transmission includes a hydraulic unit having a hydraulic pump;
wherein said differential includes
first, second and third sets of gear means,
wherein said first set of gear means is coupled to said drive shaft,
wherein said second set of gear means is carried by a carrier, said second set of gear means meshing with said first set of gear means and said carrier being coupled to said hydrostatic transmission, and
wherein said third set of gear means drives said compressor, said third set means meshing with said second set of gear means;

wherein said hydrostatic transmission further includes
fourth gear means connected to said hydraulic motor and coupled to said drive shaft, and
fifth gear means connected to said hydraulic pump and coupled to said carrier of said differential;
wherein said carrier is connected to sixth gear means for meshing with said fifth gear means of said hydrostatic transmission;
an overrunning clutch coupled between said fourth gear means and said fifth gear means of said hydrostatic transmission to prevent reverse movement of said fifth gear means relative to said fourth gear means during startup of said hydrostatic transmission; and
a pump unit coupled to said drive shaft for circulating oil for lubricating said system;
wherein said first set of gear means includes
a first spur gear coupled to said drive shaft, and
a first ring gear attached to said first spur gear, said first ring gear meshing with said second set of gear means.

15. The apparatus according to claim 14, wherein said second set of gear means comprises:
a plurality of planet gears;
wherein a first planet gear of said plurality of planet gears is provided for meshing with said first ring gear and a second planet gear of said plurality of planet gears is provided for meshing with said third set of gear means; and
said plurality of planet gears are carried by said carrier which has attached thereto said sixth gear means.

16. The apparatus according to claim 15, wherein said third set of gear means comprises:
a second ring gear for meshing with said second planet gear of said plurality of gears of said second set of gear means; and
a second spur gear attached to said second ring gear;
wherein said second spur gear is coupled to a drive shaft of said compressor.

17. The apparatus according to claim 14, wherein:
said compressor is a centrifugal air compressor which includes a plurality of stages having a first stage for receiving input air and a second stage for outputting air compressed by said compressor.

18. The apparatus according to claim 17, wherein:
said stages of said compressor are driven by said second rotational speed output by said differential.

19. The apparatus according to claim 18, wherein:
said one stage includes inlet guide vanes, disposed in said one stage, for guiding input air into said compressor.

20. The apparatus according to claim 19, wherein:
each of said plurality of stages other than said first stage includes inlet guide vanes, disposed therein for guiding air thereto from a previous stage.

21. The apparatus according to claim 20, wherein said compressor further comprises:
a surge valve for eliminating air surges in said compressor.

22. Apparatus for supplying a controlled amount of compressed air to the cabin of an aircraft, wherein said apparatus makes use of a varying rotational speed supplied by a drive shaft, said apparatus comprising:
a hydrostatic transmission coupled to said drive shaft for converting a varying rotational speed of said drive shaft into a first rotational speed and outputting said first rotational speed;

a differential coupled to said hydrostatic transmission and said drive shaft for outputting, in response to said carrying rotational speed of said drive shaft and first rotational speed of said hydrostatic transmission, a second rotational speed;

a compressor, coupled to said differential and being driven by said second rotation speed output by said differential, for compressing air from an air source and outputting compressed air;

wherein said hydrostatic transmission in response to a control signal varies said first rotational speed, thereby controlling said second rotational speed which drives said compressor;

wherein said hydrostatic transmission includes a hydraulic unit having a hydraulic pump;

wherein said differential includes first, second and third sets of gear means, wherein said first set of gear means is coupled to said drive shaft, wherein said second set of gear means is carried by a carrier, said second set of gear means meshing with said first set of gear means and said carrier being coupled to said hydrostatic transmission, and wherein said third set of gear means drives said compressor, said third set of gear means meshing with said second set of gear means;

wherein said hydrostatic transmission further includes fourth gear means connected to said hydraulic motor and coupled to said drive shaft, and fifth gear means connected to said hydraulic pump and coupled to said carrier of said differential;

wherein said carrier is connected to sixth gear means for meshing with said fifth gear means of said hydrostatic transmission;

an overrunning clutch coupled between said fourth gear means and said fifth gear means of said hydrostatic transmission to prevent reverse movement of said fifth gear means relative to said fourth gear means during startup of said hydrostatic transmission; and a pump unit coupled to said drive shaft for circulating oil for lubricating said system;

wherein said first set of gear means includes:

a first spur gear coupled to said drive shaft, and a first ring gear attached to said first spur gear, said firs ring gear meshing with said second set of gear means;

wherein said second set of gear means comprises:

a plurality of planet gears, wherein a first planet gear of said plurality of planet gears is provided for meshing with said first ring gear and a second planet gear of said plurality of planet gears is provided for meshing with said third set of gear means, and said plurality of planet gears are carried by said carrier which has attached thereto said sixth gear means;

wherein said third set of gear means comprises:

a second ring gear for meshing with said second planet gear of said plurality of gears of said second set of gear means, and a second spur gear attached to said second ring gear, wherein said second spur gear is coupled to a drive shaft of said compressor; and wherein said compressor is a centrifugal air compressor which includes a plurality of stages having a first stage for receiving input air and a second stage for outputting air compressed by said compressor.

23. The apparatus according to claim 22, wherein:

said plurality of stages of said compressor are driven by said second rotational speed output by said differential.

24. The apparatus according to claim 23, wherein:

said first stage includes inlet guide vanes, disposed in said first stage, for guiding input air into said compressor.

25. The apparatus according to claim 24, wherein:

each of said plurality of stages other than said first stage includes inlet guide vanes, disposed therein for guiding air thereto from a previous stage.

26. The apparatus according to claim 25, wherein said compressor further comprises:

a surge valve for eliminating air surges in said compressor.

* * * * *